United States Patent
Tang et al.

(10) Patent No.: US 12,404,435 B2
(45) Date of Patent: Sep. 2, 2025

(54) POLYETHER AMINE-BASED FLEXIBLE PHASE CHANGE MATERIALS WITH HIGH ENTHALPY VALUE, PREPARATION METHOD AND APPLICATION THEREOF

(71) Applicant: DALIAN UNIVERSITY OF TECHNOLOGY, Dalian (CN)

(72) Inventors: Bingtao Tang, Dalian (CN); Lu Liu, Dalian (CN); Yuang Zhang, Dalian (CN); Shufen Zhang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 19/031,105

(22) Filed: Jan. 17, 2025

(65) Prior Publication Data

US 2025/0171671 A1 May 29, 2025

Related U.S. Application Data

(63) Continuation of application No. PCT/CN2023/116010, filed on Aug. 31, 2023.

(30) Foreign Application Priority Data

Aug. 19, 2023 (CN) .......................... 202311046864.2

(51) Int. Cl.
C09K 5/06 (2006.01)
(52) U.S. Cl.
CPC .................... *C09K 5/063* (2013.01)
(58) Field of Classification Search
CPC .. C09K 5/02; C09K 5/06; C09K 5/063; Y02E 60/14
See application file for complete search history.

(56) References Cited

U.S. PATENT DOCUMENTS

| | | | |
|---|---|---|---|
| 7,985,424 B2 * | 7/2011 | Tomalia | C08G 63/46 |
| | | | 528/480 |
| 9,585,387 B1 * | 3/2017 | Hayes | A01N 25/30 |

(Continued)

FOREIGN PATENT DOCUMENTS

| CN | 110126043 A | * 8/2019 | B27K 3/10 |
|---|---|---|---|
| CN | 112717841 A | 4/2021 | |

(Continued)

OTHER PUBLICATIONS

Title of the Item: Chemical Reviews Publication Date: Mar. 22, 2023 Name of the Author: Ge Wang et al. Article Title: Phase Change Thermal Storage Materials for Interdisciplinary Applications pp. 6593-7027.

*Primary Examiner* — Matthew R Diaz
(74) *Attorney, Agent, or Firm* — Nitin Kaushik

(57) ABSTRACT

The polyether amine-based flexible phase change materials with high enthalpy value, preparation method and application thereof, which belongs to the technical field of the polymer phase change materials for energy storage. Phase change materials for heat storage comprise flexible polyether amine-based high molecule network and organic solid-liquid phase change components which is in-situ loaded in the high molecule network. Among them, the flexible polyether amine-based high molecule network has good compatibility with organic phase change components, and the organic phase change molecules are wrapped around polyether amine-based high molecule chains to form crystalline domain with overall flexibility, realizing the organic combination of flexibility and high heat storage capacity. Design and development of the flexible phase change materials with high enthalpy value possess important application value in the flexible wearables and thermal management of electronic components.

10 Claims, 5 Drawing Sheets

(56) References Cited

U.S. PATENT DOCUMENTS

| | | | |
|---|---|---|---|
| 2016/0223269 A1* | 8/2016 | Hartmann | C09K 5/063 |
| 2018/0273819 A1* | 9/2018 | Sutterlin | C09K 5/063 |
| 2020/0377646 A1* | 12/2020 | Cui | C09K 5/14 |
| 2021/0347934 A1* | 11/2021 | Zheng | G02B 1/04 |

FOREIGN PATENT DOCUMENTS

| | | | | |
|---|---|---|---|---|
| CN | 116462829 A | * | 7/2023 | C08G 59/44 |
| JP | 2009203352 A | | 9/2009 | |

* cited by examiner

POLYETHER AMINE-BASED FLEXIBLE PHASE CHANGE MATERIALS WITH HIGH ENTHALPY VALUE, PREPARATION METHOD AND APPLICATION THEREOF

CROSS-REFERENCE TO RELATED APPLICATIONS

The application claims priority to Chinese patent application No. 202311046864.2, filed on Aug. 19, 2023, the entire contents of which are incorporated herein by reference.

TECHNICAL FIELD

The present invention relates to the polyether amine-based flexible phase change materials with high enthalpy value, preparation method and application thereof, which belongs to technical field of polymer phase change materials for energy storage.

TECHNICAL BACKGROUND

Latent heat storage of phase change materials can effectively solve the imbalance between heat supply and demand in time and space with its advantages of high density of heat storage and low application cost. It has been widely used in technical fields of peak shaving and valley filling in the power industry, heating and insulation in the construction industry, and temperature control as well as heat dissipation of the electronic components. Among them, organic solid-liquid phase change materials (Solid-liquid PCMs) can store the thermal energy in the form of latent heat inside molecules through reversible transformation of its own phase state, and release the stored thermal energy when required, thereby absorbing or releasing a tremendous amount of the thermal energy within a constant temperature range, effectively improving the utilization rate of thermal energy. However, organic solid-liquid phase change materials have many limitations. Their large rigidity in the solid state limits the application, and leakage problems caused by fluidity after phase change has become a bottleneck restricting further development. (Wang, Ge, et al. "Phase change thermal storage materials for interdisciplinary applications." *Chemical Reviews* 123.11 (2023): 6953-7024.)

At present, flexible phase change materials can be bent to a certain extent by melt blending of organic phase change materials as well as high molecular polymers and grafting or modification etc. Further, improvement of flexibility often requires subsequent processing such as hot pressing and thinning of the materials. Despite this, problem of high brittleness and poor bending resistance caused by its high rigidity at room temperature has not been solved, and the following development and research are urgently needed. Therefore, development and preparation of intrinsically flexible phase change materials can achieve temperature regulation and heat insulation in the complicated application scenarios, especially in flexible wearables as well as thermal management of electronic components, which have important application value.

SUMMARY OF THE INVENTION

The present invention aims to solve key problems of high brittleness at room temperature as well as poor bending resistance of organic phase change material, and to construct intrinsically flexible phase change materials with high enthalpy value for the heat storage. From the perspective of molecular structure design, key to achieving its intrinsic flexibility is to design polyether amine-based high molecule network with good flexibility and compatibility of phase change components. At the same time, polyether amine-based high molecule network is in-situ encapsulated with phase change components of organic solid-liquid materials to develop intrinsically flexible phase change materials for heat storage, which possesses high loading rate of phase change components. While solving problems of low loading rate as well as leakage of phase change materials, they are given good overall flexibility. Design and development of the flexible phase change materials with high enthalpy value possess important application value in flexible wearables and thermal management of electronic components.

Purpose of the present invention is to provide intrinsically flexible phase change materials with high enthalpy value for heat storage. The present phase change materials have good flexibility and bending resistance based on their high heat storage capacity. It can not only store heat but also control temperature stably and efficiently for long time, and therefore possesses broad application prospects.

The intrinsically flexible phase change material with high enthalpy value for heat storage comprises the flexible polyether amine-based high molecule network which is in-situ encapsulated with organic phase change molecules. The flexible polyether amine-based high molecule network has good compatibility with organic phase change components. Organic phase change molecules are wrapped around polyether amine-based polymer chain to form crystalline domain with overall flexibility, thereby achieving the organic combination of high heat storage capacity and flexibility. While solving problems of low loading rate and leakage of phase change materials, they are given good overall flexibility. The design and development of flexible phase change materials with high enthalpy value possess important application value in flexible wearables and thermal management of electronic components.

Furthermore, the flexible polyether amine-based high molecule network is high molecular polymer having the following structural formula, wherein n is an integer of 10 to 1,000.

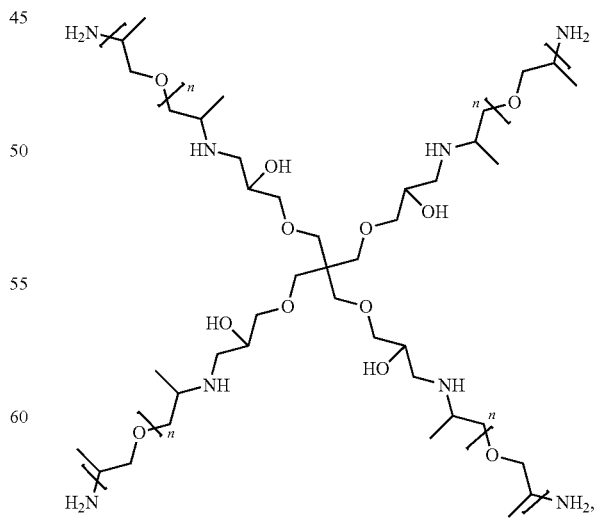

Furthermore, flexible polyether amine-based high molecule network of present invention is formed by the ring-opening polymerization reaction of pentaerythritol tetraglycidyl ether-based molecules as well as polyether amine-based molecules in the organic solvent, wherein mass ratio of polyether amine-based molecules to pentaerythritol tetraglycidyl ether is 3:1 to 10:1. Polyether amine-based high molecule chains are entangled with each other to build a network structure and in-situ encapsulate the organic phase change components simultaneously.

Preferably, mass ratio of the polyether amine to the organic solvent is 1:5 to 1:10.

Preferably, the solvent is at least one of the tetrahydrofuran, chloroform, petroleum ether, dioxane, acetone, carbon disulfide, benzene, toluene, nitrobenzene, chlorobenzene, cyclohexane and n-hexane.

Preferably, organic phase change component is at least one of aliphatic alcohols (which are dodecanol, tetradecanol, hexadecanol, octadecanol), the aliphatic acids (which are dodecanoic acid, tetradecanoic acid, hexadecanoic acid, octadecanoic acid, eicosanoid acid), aliphatic hydrocarbons (which are dodecane, tetradecane, hexadecane, octadecane, eicosane), the n-butyl stearate, methyl palmitate, methyl stearate, octadecyl thioglycolate, acetamide, phorone, polyethylene glycol and polyvinyl alcohol.

When two types of organic phase change component are used, different aliphatic alcohols, aliphatic hydrocarbons and aliphatic acid molecules are mixed in mass ratio of 1:1, such as mass ratio of dodecanol to tetradecanol of 1:1, or mass ratio of hexadecanol to tetradecanoic acid of 1:1, or mass ratio of dodecane to hexadecanoic acid of 1:1, etc.

Alternatively, n-butyl stearate, methyl palmitate, methyl stearate, octadecyl thioglycolate, acetamide, phorone, polyethylene glycol and polyvinyl alcohol are mixed with different aliphatic alcohols, aliphatic hydrocarbons and aliphatic acid molecules in the mass ratio of 1:1, such as mass ratio of butyl stearate to dodecane of 1:1, or mass ratio of methyl palmitate to tetradecanol of 1:1, or mass ratio of octadecyl thioglycolate to hexadecanoic acid of 1:1, etc.

Another purpose of the present invention is to provide a method for preparing the above-mentioned intrinsically flexible phase change materials with high enthalpy value for heat storage.

The method for preparing the intrinsically flexible phase change materials for heat storage, comprising the following steps:
1) preparing the organic dispersion system of polyether amine-based molecules as well as pentaerythritol tetraglycidyl ether-based molecules,
2) adding phase change molecules into the dispersed system obtained in step 1), then in-situ loading phase change components to obtain the organic prepolymer, and
3) placing prepolymer obtained in step 2) in a static state, then heating and drying it after the solvent is removed to obtain the flexible phase change material.

The intrinsically flexible phase change materials for heat storage of the present invention construct the polyether amine-based high molecule network with high flexibility to in-situ load the organic phase change molecules, and utilizes the high flexibility of flexible polyether amine-based high molecule network as well as its compatibility with organic phase change components, thereby realizing preparation of flexible phase change materials with high enthalpy value for heat storage.

In present technical solution, according to step 1), polyether amine-based molecules and pentaerythritol tetraglycidyl ether-based molecules are dispersed in the organic solvent and mixed evenly by magnetic stirring. The mass ratio of polyether amine-based molecules to pentaerythritol tetraglycidyl ether-based molecules is 3:1 to 10:1, and mass ratio of flexible polyether amine-based high molecule network to the organic solvent is 1:5 to 1:10.

Furthermore, time of magnetic stirring is 3 to 12 h, system temperature is preferably 30° C., and rotation speed is preferably 1000 r/min.

In the present technical solution, according to step 2), phase change components are added to mixed system obtained in step 1), and magnetic stirring is performed to make it evenly mixed. Under heating conditions, polyether amine-based molecules as well as pentaerythritol tetraglycidyl ether-based molecules undergo ring-opening polymerization reaction in organic dispersion system to generate polyether amine-based high molecule network and in-situ load phase change molecules to obtain organic prepolymer.

Furthermore, during the reaction, heating temperature is preferably 40° C., reaction time is preferably 9 to 12 h, and rotation speed is preferably 800 r/min.

In the present technical solution, according to step 3), the obtained prepolymer is placed at room temperature, and then is heated and dried after the solvent is removed to obtain the flexible phase change material.

Furthermore, standing temperature is room temperature, standing time is preferably 10 to 24 h, heating temperature is preferably 120° C., and drying time is preferably 8 to 12 h.

Furthermore, the intrinsically flexible phase change material with high enthalpy value for heat storage possesses important application value in flexible smart fabrics or thermal management of electronic components.

The present invention provides a method for preparing intrinsically flexible phase change material with high enthalpy value for heat storage and application thereof, which has the following beneficial effects: The present invention prepares polyether amine-based high molecule network with good flexibility from perspective of design of flexibility of molecular structure, and in-situ loads phase change components, thereby achieving construction of flexible skeleton network and its composition with phase change materials. It effectively solves key problems of high brittleness at room temperature as well as poor bending resistance of organic phase change materials, and has high density of energy storage as well as good flexibility.

The intrinsically flexible phase change materials for heat storage of the present invention have characteristics of high load of phase change components as well as good flexibility at room temperature. Range of operating temperature during phase changing of material can be directional selected and regulated through organic phase change materials for energy storage, and has broad application prospects in technical fields of temperature control and heat dissipation of electronic components and energy saving of the buildings.

DETAILED DESCRIPTION OF THE EMBODIMENTS

The following non-limiting embodiments may enable a person skilled in the art to more fully understand the present invention, but are not intended to limit present invention in any way.

The testing methods described in the following embodiments are conventional methods unless otherwise specified. Besides, the reagents and materials described herein may be obtained from any number of commercial sources unless otherwise specified.

Embodiment 1

1) 0.6 g of pentaerythritol tetraglycidyl ether and 2.4 g of polyether amine are dispersed in 18.0 g of toluene solution and then stirred under magnetic heating at 1000 r/min for 6 h to make the system homogeneous and stable.
2) Under magnetic stirring at 800 r/min, 7.0 g of hexadecanol is added to system obtained in step 1), and then reacted at 40° C. for 12 h to obtain organic prepolymer.
3) The system is placed at the room temperature for 24 h and then dried at 120° C. for 12 h, obtaining polyether amine-based flexible phase change material with the phase change component loading rate of 70% (which is labeled as 70% FPCMs).

Figure 1:
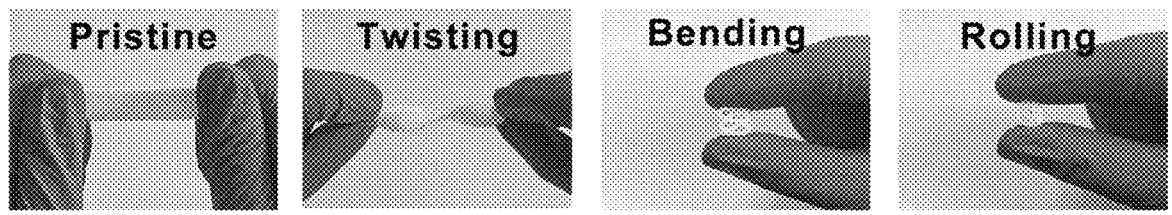
FIG. 1 is the digital photos of intrinsically flexible phase change materials for heat storage under different bending and folding states in Embodiment 1.

FIG. 1 is digital photos of prepared intrinsically flexible phase change materials for heat storage in different bending and folding states. The present flexible phase change materials have no creases after being folded at room temperature and has good flexibility and bending resistance.

Figure 2:
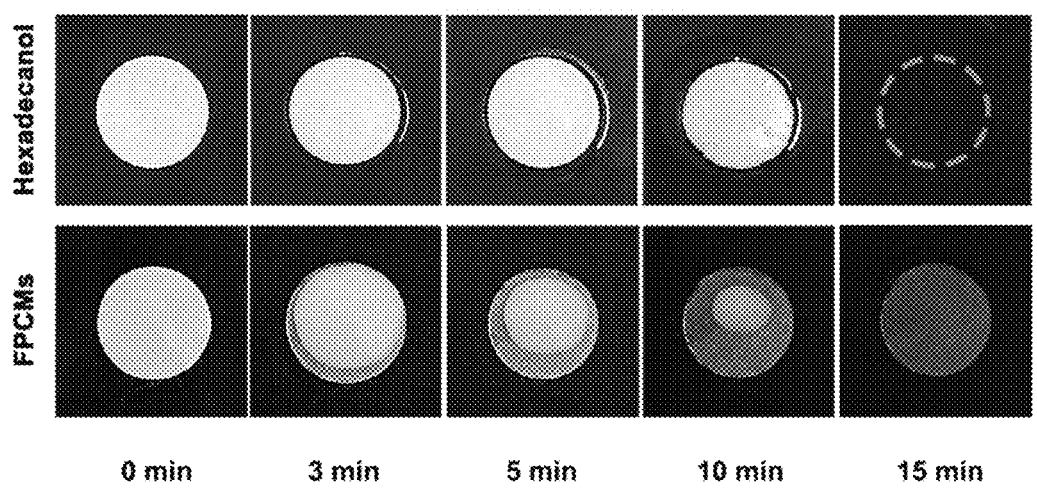
FIG. 2 is a comparison diagram of the shaping effect of hexadecanol (I) and flexible phase change material (II) in Embodiment 1.

When shaping effect of flexible phase change materials for heat storage is tested at 80° C., FIG. 2 shows that the obtained flexible phase change materials for heat storage has excellent shape stability and will not leak at 80° C., while hexadecanol molecules are phase changed into flowable liquid during the heating process.

By using the above preparation method, when adding different amounts of hexadecanol, polyether amine-based flexible phase change materials with hexadecanol loading rate of 50%, 80% as well as 90% can be obtained, which are recorded as 50% FPCMs, 80% FPCMs and 90% FPCMs respectively.

Figure 3:
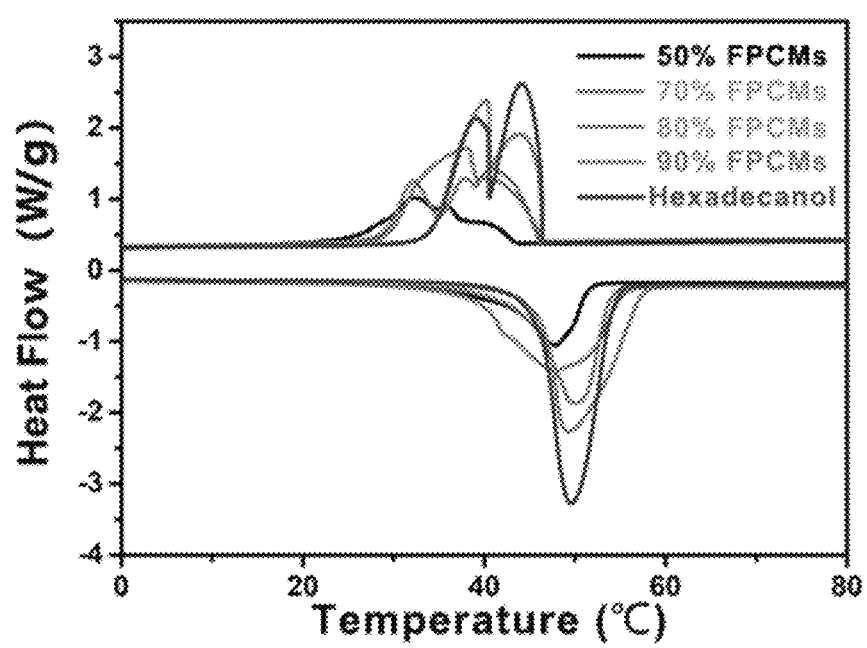
FIG. 3 is a DSC diagram of intrinsically flexible phase change materials for heat storage with different loading amounts in Embodiment 1.

When the test of flexible phase change materials for heat storage as well as hexadecanol is performed using differential scanning calorimetry (DSC), the results are shown in the DSC curve in FIG. 3, wherein 50% FPCMs, 70% FPCMs, 80% FPCMs and 90% FPCMs represent polyether amine-based flexible phase change materials at different hexadecanol loading amounts. Enthalpy value of the polyether amine-based flexible phase change materials increases with the increase of the hexadecanol loading rate of phase change components. The enthalpy value of the flexible phase change materials for heat storage is between 100 and 180 J/g, and its phase change performance is adjustable, which provides the guarantee for practical application.

Figure 4:
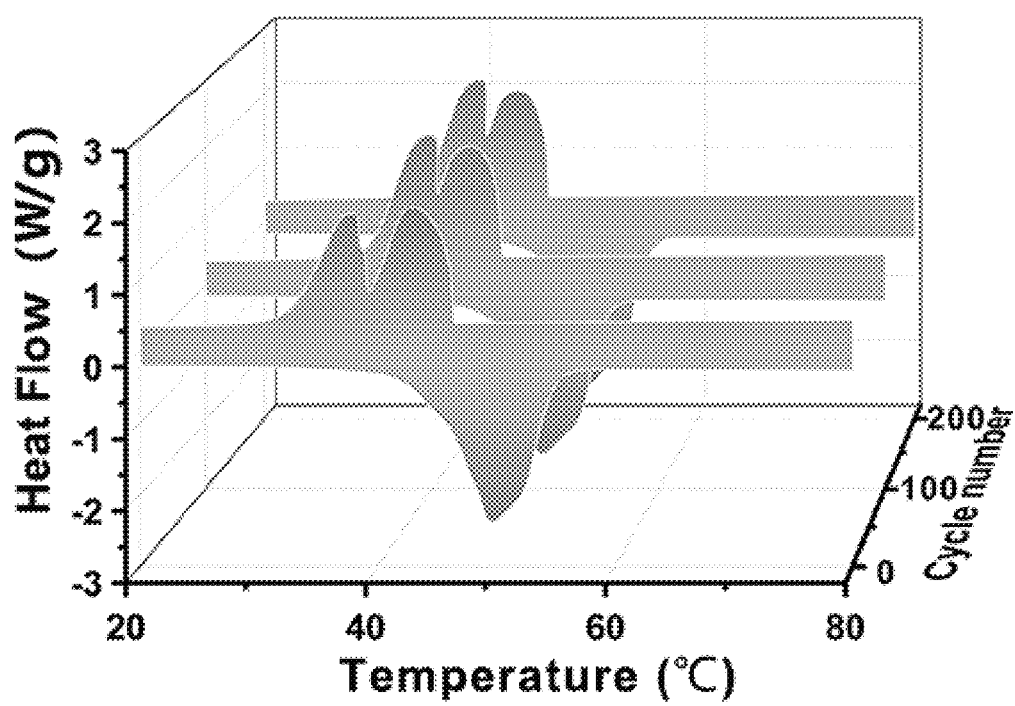
FIG. 4 is a DSC diagram of intrinsically flexible phase change materials for heat storage in Embodiment 1 before and after thermal cycle test.
Figure 5:
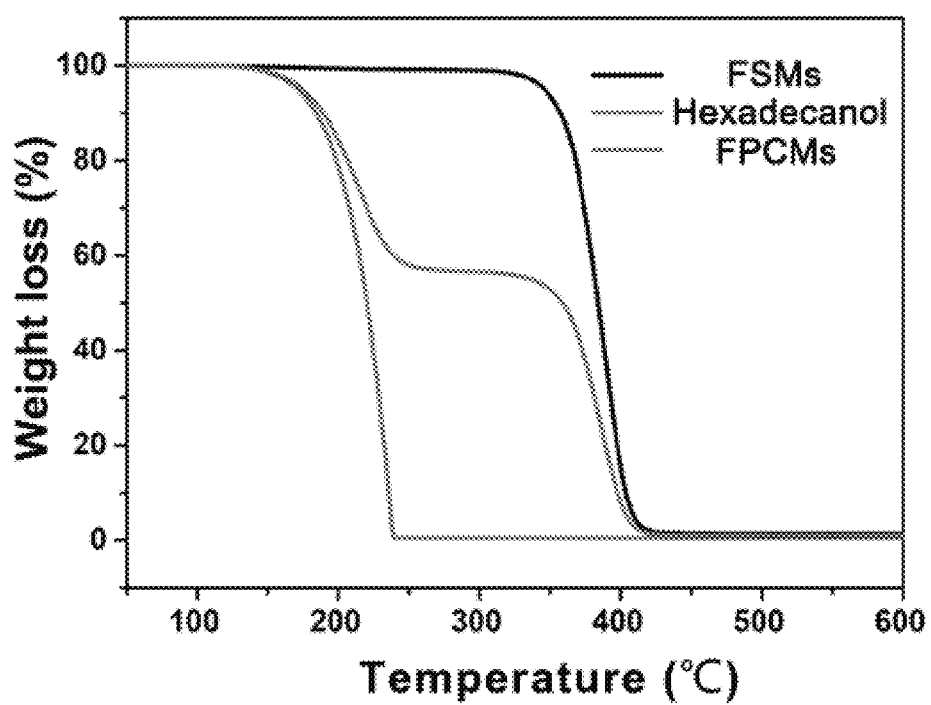
FIG. 5 is test result of thermogravimetric analysis of intrinsically flexible phase change materials for heat storage in Embodiment 1.

When cycle performance of composite phase change materials is tested, results are shown in FIG. 4. After 200 thermal cycle tests, the enthalpy value has no significant decrease, and energy storage performance is stable. In addition, FIG. 5 shows thermogravimetric analysis test results of the flexible phase change materials for heat storage, which show that it has good thermal stability and will not undergo thermal decomposition at 150° C.

Embodiment 2 to 14

When hexadecanol in Embodiment 1 is replaced with dodecane, tetradecane, hexadecane, octadecane, eicosane, dodecanol, tetradecanol, octadecanol, dodecanoic acid. tefradecangic acid, hexadecangis acid, octadecanoic acid as well as eicosanoid acid, different aliphatic alcohol-based, aliphatic acid-based and aliphatic hydrocarbon-based flexible phase change materials for the heat storage can be obtained by compounding, and other conditions are consistent with Embodiment 1. Composite phase change materials obtained have good heat storage performance and flexibility at room temperature.

Embodiment 15

1) 0.6 g of pentaerythritol tetraglycidyl ether and 2.4 g of polyether amine are dispersed in 18.0 g of toluene solution and then stirred under magnetic heating at 1000 r/min for 6 h to make the system homogeneous and stable.
2) Under magnetic stirring at 800 r/min, 3.5 g of hexadecanol and 3.5 g of tetradecanol are added to system obtained in step 1), and then reacted at 40° C. for 12 h to obtain organic prepolymer.
3) The system is placed at the room temperature for 24 h and then dried at 120° C. for 12 h, obtaining polyether amine-based flexible phase change materials with a phase change component loading rate of 70%.

Embodiment 16 to 102

When hexadecanol in Embodiment 1 is replaced with the mixed system with a mass ratio of 1:1, which contains the dodecanol and tetradecanol, dodecanol and hexadecanol, dodecanol and octadecanol, dodecanol and dodecane, dodecanol and tetradecane, dodecanol and hexadecane, dodecanol and octadecane, dodecanol and eicosane, dodecanol and dodecanoic acid, dodecanol and tetradecanoic acid, dodecanol and hexadecanoic acid, dodecanol and octadecanoic acid, dodecanol and eicosanoic acid, tetradecanol and hexadecanol, tetradecanol and octadecanol, tetradecanol and dodecane, tetradecanol and tetradecane, tetradecanol and hexadecane, tetradecanol and octadecane, tetradecanol and eicosane, tetradecanol and dodecanoic acid, tetradecanol and tetradecanoic acid, tetradecanol and hexadecanoic acid, tetradecanol and octadecanoic acid, tetradecanol and eicosanoic acid, hexadecanol and octadecanol, hexadecanol and dodecane, hexadecanol and tetradecane, hexadecanol and hexadecane, hexadecanol and octadecane, hexadecanol and eicosane, hexadecanol and dodecanoic acid, hexadecanol and tetradecanoic acid, hexadecanol and hexadecanoic acid, hexadecanol and octadecanoic acid, hexadecanol and eicosanoic acid, octadecanol and dodecane, octadecanol and tetradecane, octadecanol and hexadecane, octadecanol and octadecane, octadecanol and eicosane, octadecanol and dodecanoic acid, octadecanol and tetradecanoic acid, octadecanol and hexadecanoic acid, octadecanol and octadecanoic acid, octadecanol and eicosanoic acid, dodecane and tetradecane, dodecane and hexadecane, dodecane and octadecane, dodecane and eicosane, dodecane and dodecanoic acid, dodecane and tetradecanoic acid, dodecane and hexadecanoic acid, dodecane and octadecanoic acid, dodecane and eicosanoic acid, tetradecane and hexadecane, tetradecane and octadecane, tetradecane and eicosane, tetradecane and dodecanoic acid, tetradecane and tetradecanoic acid, tetradecane and hexadecanoic acid, tetradecane and octadecanoic acid, tetradecane and eicosanoic acid, hexadecane and octadecane, hexadecane and eicosane, hexadecane and dodecanoic acid, hexadecane and tetradecanoic acid, hexadecane and hexadecanoic acid, hexadecane and octadecanoic acid, hexadecane and eicosanoic acid, octadecane and eicosane, octadecane and dodecanoic acid, octadecane and tetradecanoic acid, octadecane and hexadecanoic acid, octadecane and octadecanoic acid, octadecane and eicosanoic acid, eicosane and dodecanoic acid, dodecanoic acid and tetradecanoic acid, dodecanoic acid and hexadecanoic acid, dodecanoic acid and octadecanoic acid, dodecanoic acid and eicosanoic acid, tetradecanoic acid and hexadecanoic acid, tetradecanoic acid and octadecanoic acid, tetradecanoic acid and eicosanoic acid, hexadecanoic acid and octadecanoic acid, hexadecanoic acid and eicosanoic acid or octadecanoic acid and eicosanoic acid respectively, the polyether amine-based flexible phase change materials can be obtained by compounding, and other remaining conditions are consistent with Embodiment 1. The composite phase change material obtained possesses good heat storage performance as well as flexibility at room temperature.

Embodiment 103

1) 0.6 g of pentaerythritol tetraglycidyl ether and 2.4 g of polyether amine are dispersed in 18.0 g of toluene solution and then stirred under magnetic heating at 1000 r/min for 6 h to make the system homogeneous and stable.
2) Under magnetic stirring at 800 r/min, 7.0 g of butyl stearate is added to system obtained in step 1), and then reacted at 40° C. for 12 h to obtain organic prepolymer.
3) The system is placed at the room temperature for 24 h and then dried at 120° C. for 12 h, obtaining polyether amine-based flexible phase change materials with phase change component loading rate of 70%.

Embodiment 104 to 117

When hexadecanol in Embodiment 1 is replaced with the mixed system with a mass ratio of 1:1, containing butyl stearate and dodecanol, tetradecanol, octadecanol, dodecane, tetradecane, hexadecane, octadecane, eicosane, dodecanoic acid, tetradecanoic acid, hexadecanoic acid, octadecanoic acid or eicosanoic acid respectively, the polyether amine-based flexible phase change materials can be obtained by compounding, and other conditions are consistent with Embodiment 1. Composite phase change materials obtained have good heat storage performance and flexibility at room temperature.

Embodiment 118

1) 0.6 g of pentaerythritol tetraglycidyl ether and 2.4 g of polyether amine are dispersed in 18.0 g of toluene solution and then stirred under magnetic heating at 1000 r/min for 6 h to make the system homogeneous and stable.
2) Under magnetic stirring at 800 r/min, 7.0 g of the methyl stearate is added to the system obtained in step 1), and then reacted at 40° C. for 12 h to obtain organic prepolymer.
3) The system is placed at the room temperature for 24 h and then dried at 120° C. for 12 h, obtaining polyether amine-based flexible phase change materials with phase change component loading rate of 70%.

Embodiment 119 to 132

When hexadecanol in Embodiment 1 is replaced with the mixed system with a mass ratio of 1:1, containing methyl stearate and dodecanol, tetradecanol, octadecanol, dodecane, tetradecane, hexadecane, octadecane, eicosane, dodecanoic acid, tetradecanoic acid, hexadecanoic acid, octadecanoic acid or eicosanoic acid respectively, the polyether amine-based flexible phase change materials can be obtained by compounding, and other conditions are consistent with Embodiment 1. The composite phase change materials obtained possesses good heat storage performance and flexibility at room temperature.

Embodiment 133

1) 0.6 g of pentaerythritol tetraglycidyl ether and 2.4 g of polyether amine are dispersed in 18.0 g of toluene solution and then stirred under magnetic heating at 1000 r/min for 6 h to make the system homogeneous and stable.
2) Under magnetic stirring at 800 r/min, 7.0 g of the methyl palmitate is added to system obtained in step 1), and then reacted at 40° C. for 12 h to obtain organic prepolymer.
3) The system is placed at the room temperature for 24 h and then dried at 120° C. for 12 h, obtaining polyether amine-based flexible phase change materials with a phase change component loading rate of 70%.

Embodiment 134 to 147

When hexadecanol in Embodiment 1 is replaced with the mixed system with a mass ratio of 1:1, which contains the methyl palmitate and dodecanol, tetradecanol, octadecanol, dodecane, tetradecane, hexadecane, octadecane, eicosane, dodecanoic acid, tetradecanoic acid, hexadecanoic acid, octadecanoic acid or eicosanoic acid respectively, the polyether amine-based flexible phase change materials can be obtained by compounding, and other remaining conditions are consistent with Embodiment 1. The composite phase change materials obtained possess good heat storage performance as well as flexibility at room temperature.

Embodiment 148

1) 0.6 g of pentaerythritol tetraglycidyl ether and 2.4 g of polyether amine are dispersed in 18.0 g of toluene solution and then stirred under magnetic heating at 1000 r/min for 6 h to make the system homogeneous and stable.
2) Under magnetic stirring at 800 r/min, 7.0 g of octadecyl thioglycolate is added to system obtained in step 1), and then reacted at 40° C. for 12 h to obtain organic prepolymer.
3) The system is placed at the room temperature for 24 h and then dried at 120° C. for 12 h, obtaining polyether amine-based flexible phase change materials with phase change component loading rate of 70%.

Embodiment 149 to 162

When hexadecanol in Embodiment 1 is replaced with the mixed system with a mass ratio of 1:1, which contains octadecyl thioglycolate and dodecanol, tetradecanol, octadecanol, dodecane, tetradecane, hexadecane, octadecane, eicosane, dodecanoic acid, tetradecanoic acid, hexadecanoic acid, octadecanoic acid or eicosanoic acid respectively, the polyether amine-based flexible phase change materials can be obtained by compounding, and other remaining conditions are consistent with Embodiment 1. The composite phase change materials obtained possess good heat storage performance as well as flexibility at room temperature.

What is claimed is:

1. A polyether amine-based flexible phase change material, comprising:
   a flexible polyether amine-based polymer having the following structural formula:

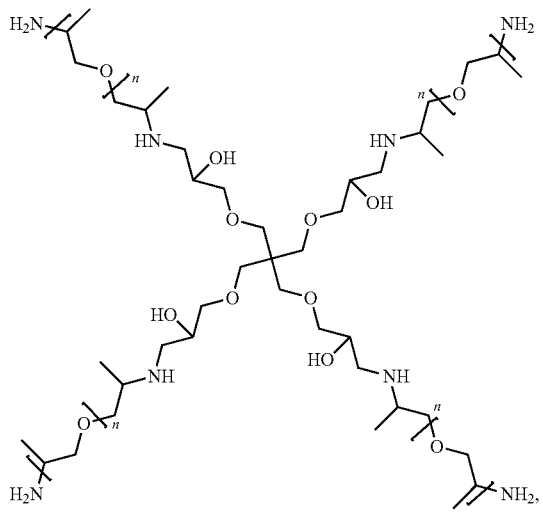

wherein n is an integer of 10 to 1,000, and
   an organic solid-liquid phase change material in-situ loaded within the flexible polyether amine-based polymer.

2. The polyether amine-based flexible phase change material according to claim 1, wherein the mass ratio of the flexible polyether amine-based polymer to the organic solid-liquid phase change material is from 1:2 to 1:8.

3. The polyether amine-based flexible phase change material according to claim 1, wherein the flexible polyether amine-based polymer is formed by a polymerization reaction of a polyether amine and a pentaerythritol tetraglycidyl ether in an organic solvent, wherein the mass ratio of the polyether amine to the pentaerythritol tetraglycidyl ether is from 3:1 to 10:1.

4. The polyether amine-based flexible phase change material according to claim 3, wherein the mass ratio of the polyether amine to the organic solvent is from 1:5 to 1:10, and wherein the organic solvent is at least one of tetrahydrofuran, chloroform, petroleum ether, dioxane, acetone, benzene, toluene, nitrobenzene, chlorobenzene, cyclohexane and n-hexane.

5. The polyether amine-based flexible phase change material according to claim 1, wherein the organic solid-liquid phase change material is at least one of dodecanol, tetradecanol, hexadecanol, octadecanol, dodecanoic acid, tetradecanoic acid, hexadecanoic acid, octadecanoic acid, eicosanoid acid, dodecane, tetradecane, hexadecane, octadecane, eicosane, n-butyl stearate, methyl palmitate, methyl stearate, octadecyl thioglycolate, acetamide, phorone, polyethylene glycol and polyvinyl alcohol.

6. A method for preparing the polyether amine-based flexible phase change material according to claim 1, comprising the following steps:
   1) preparing an organic dispersion system of a polyether amine and a pentaerythritol tetraglycidyl ether,
   2) adding the organic solid-liquid phase change material into the organic dispersed system, then in-situ loading the organic solid-liquid phase change material to obtain an organic prepolymer, and
   3) placing the organic prepolymer in a static state, then removing solvent from the organic prepolymer, and then heating and drying the resulting composition to obtain the polyether amine-based flexible phase change material.

7. The polyether amine-based flexible phase change material according to claim 1, wherein the polyether amine-based flexible phase change material is used in a flexible thermal management component.

8. The polyether amine-based flexible phase change material according to claim 1, wherein the polyether amine-based flexible phase change material is applied to a flexible intelligent fabric.

9. The polyether amine-based flexible phase change material according to claim 1, wherein the polyether amine-based flexible phase change material is used in a temperature-regulating and energy-saving building material.

10. The polyether amine-based flexible phase change material according to claim 1, wherein a phase change enthalpy value of the polyether amine-based flexible phase change material is between 100 and 180 J/g.

* * * * *